United States Patent [19]

Lindstedt

[11] Patent Number: 5,375,948
[45] Date of Patent: Dec. 27, 1994

[54] CUTTING INSERT FOR CUTTING AND GROOVING TOOLS

[75] Inventor: Lars Lindstedt, Sandviken, Sweden

[73] Assignee: Sandvik AB, Sandviken, Sweden

[21] Appl. No.: 53,232

[22] Filed: Apr. 28, 1993

[30] Foreign Application Priority Data

Apr. 30, 1992 [SE] Sweden ............... 9201364-8

[51] Int. Cl.$^5$ .................. B23B 27/08; B23B 27/22
[52] U.S. Cl. ..................... 407/116; 407/117
[58] Field of Search ............. 407/114, 115, 116, 117

[56] References Cited

U.S. PATENT DOCUMENTS

| | | | |
|---|---|---|---|
| 4,844,668 | 7/1989 | Pettersson | 407/117 |
| 4,934,879 | 6/1990 | van Barnveld | 407/66 |
| 4,969,779 | 11/1990 | Barten | 407/115 |
| 4,973,204 | 11/1990 | Mihic | 407/116 |
| 4,988,242 | 1/1991 | Pettersson et al. | 407/114 |
| 4,992,008 | 2/1991 | Pano | 407/116 |
| 5,074,720 | 12/1991 | Loqvist et al. | 407/114 |

Primary Examiner—William E. Terrell
Attorney, Agent, or Firm—Burns, Doane, Swecker & Mathis

[57] ABSTRACT

The present invention relates to a turning insert that comprises a generally rectangularly shaped body having a front end surface with a main cutting edge at the intersection between the front end surface and an upper land area. A chipforming area is provided in the forward portion of the upper surface and is shaped in the form of a number of distinctly provided recesses and ridges in order to promote improved chip control and to obtain narrower chips in grooving operations.

12 Claims, 3 Drawing Sheets

CUTTING INSERT FOR CUTTING AND GROOVING TOOLS

BACKGROUND AND SUMMARY OF THE PRESENT INVENTION

The present invention relates to a cutting insert for turning and grooving tools, primarily for grooving operations in metal workpieces. The insert could also be useful for cutting off rods, tubes or other rotationally symmetrical details. Such cutting inserts are provided with a cutting edge formed by the transition between the top surface or rake surface of the insert and its forward clearance face.

In metal cutting operations, the breaking of the chip and the shape of the chip are often of great importance for an undisturbed production. In modern, high production machines and tools, there is great demand for an efficient chip removal and good chip control. This is of special importance in such high-production machines in which a series of different tools are performing different operations in a continuous sequence. It is not unusual that in such operations the chips may become tangled and wrap around the workpiece or the tool. This creates problems in subsequent operations, especially if automated workpiece handling equipment is involved. These difficulties are compounded when it comes to camshaft or crankshaft turning where several grooves are generated in one operation. The end result is usually high production costs due to expansive machine downtime to clear chips or repair tools.

In view of the above and related difficulties with prior art inserts and tools, it is a purpose of the present invention to provide an improved type of turning insert that is formed so as to optimize chip control for the specific demands and conditions of the difficult operations referred to above.

In accordance with the present invention, a dimpled chipbreaker and the confining walls thereof are designed so as to form the chip narrower than the groove such that more efficiently manageable safe chips can be obtained. Chip disposal should become safer, more efficient and less costly. With such inserts, it should become possible to generate a finished groove in one pass of the workpiece, such as a crankshaft.

BRIEF DESCRIPTION OF THE DRAWING FIGURES

These and other objects have been achieved by shaping the insert as described hereinafter in connection with the appended drawings, wherein like members bear like reference numerals and wherein.

DETAILED DESCRIPTION OF THE PREFERRED EMBODIMENTS

Figure 1:
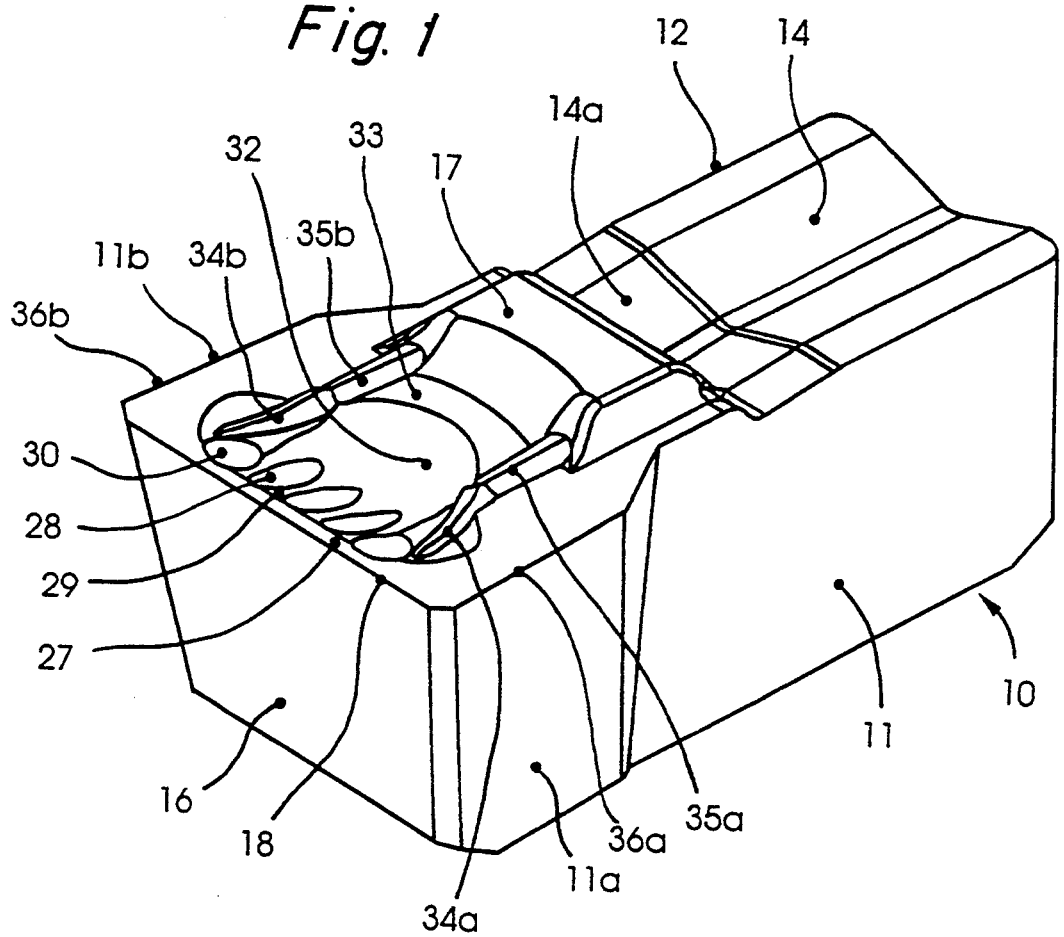
FIG. 1 is a perspective view of an insert according to the present invention.

An insert 10 according to the invention is shown in the drawing figures. The insert is in the shape of a polygonal body of generally parallelepipedic shape. It comprises two mainly plane-parallel side surfaces 11, 12, opposed top and bottom surfaces 14 and 13, respectively, two end surfaces 15, 16, and a shoulder 17. The front portion of the insert is provided with a main cutting edge 18 and a chip forming area 19. The insert is intended to be secured to a holder body 20 (FIG. 8) provided with an integral clamping arm 21. The top surface 14 is broken at the vicinity of the shoulder 17 so that an upper surface portion 14a forms an acute angle with the remainder of the surface 14.

Figure 8:
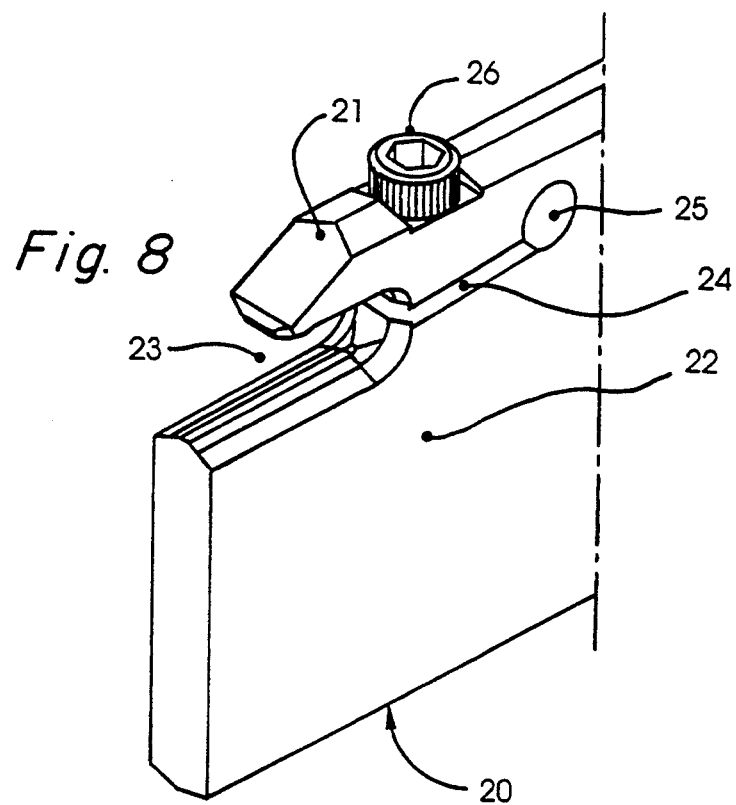
FIG. 8 is a perspective view of a holder for the insert.

With reference to FIG. 8, the insert 10 is intended to be removably held in a holder, which includes the holder body 20 having an integral clamping arm 21 in a front portion 22 of the holder body 20 and an insert receiving recess 23 in which the insert 10 is to be located. The insert receiving recess 23 communicates at an inner end thereof with an elongated slit 24 which terminates in a circular recess 25. A clamping screw 26 extends into the holder 20 through the clamping arm 21 and through the slit 24. When the screw 26 is threaded into the holder, the clamping arm 21 flexes downwardly about the recess 23 and urges the clamping arm 21 into firm clamping abutment with the upper surface 14 of the insert. More specifically, a nose portion of the clamping arm 21 is somewhat inclined downwardly so that the nose matches the inclination of the upper surface portion 14a of the insert 10.

Figure 9:
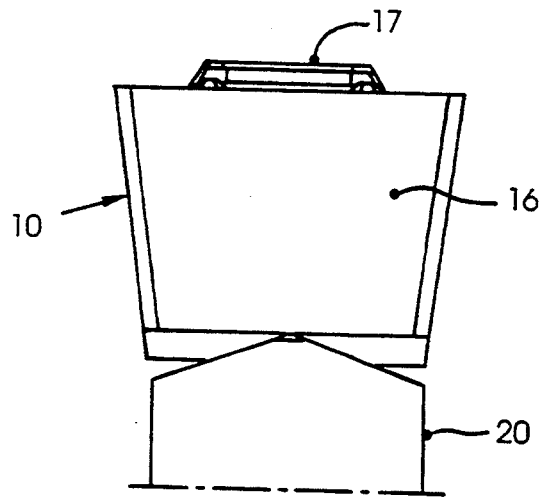
FIG. 9 is a partial front view of the insert located in the tip-seat of the holder of FIG. 8.

The bottom surface 13 of the insert is intended to be a first support surface for the insert against the holder body and a portion of the bottom surface 13 is parallel with a neutral plane P (FIG. 2) defined by the axial feed direction of the machine. More specifically, the bottom surface 13 includes two distinct flat surface portions 13a and 13d, with two inclined surfaces 13b and 13c therebetween. The inclined surfaces 13b and 13c are intended to abut with correspondingly inclined surfaces in the insert site of the holder as shown in FIG. 9. As appears from FIG. 9, the surfaces 13a and 13d are not active support surfaces. The top surface 14 constitutes a second support surface for the insert against the holder body 20. The top surface 14 is oriented parallel with the flat bottom surface portions 13a and 13d.

Figure 2:
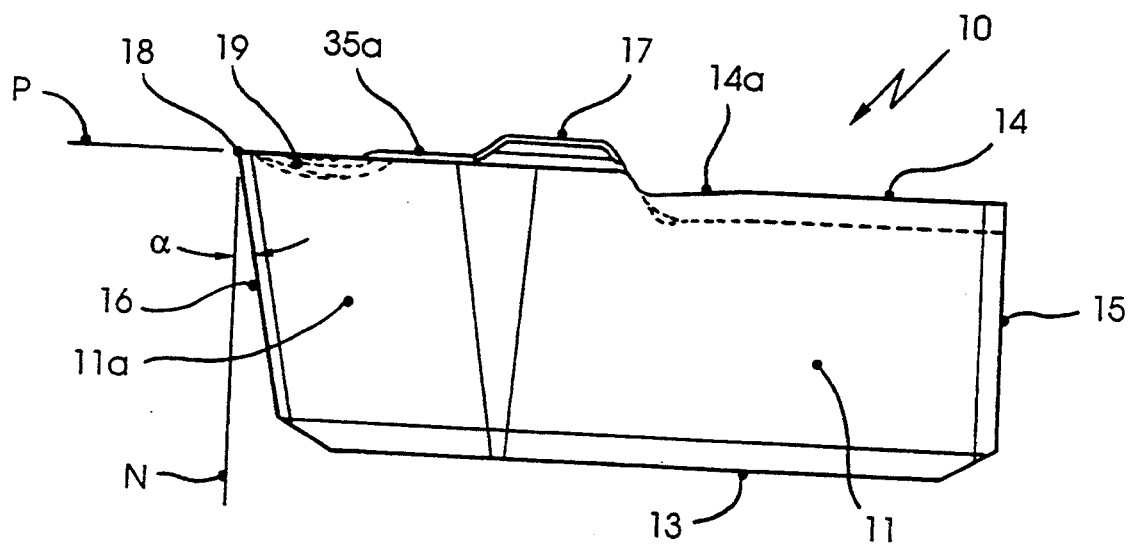
FIG. 2 is a side view of the insert of FIG. 1.

The cutting edge 18 is straight and is formed along the intersecting line of a clearance face 16 and a primary land 27. The clearance face 16, which is the front end surface of the insert, forms an acute angle $\alpha$, about 1°-15° with a normal N drawn to the primary land 27 (FIG. 2). The primary land 27 coincides with the neutral plane P.

Figure 3:
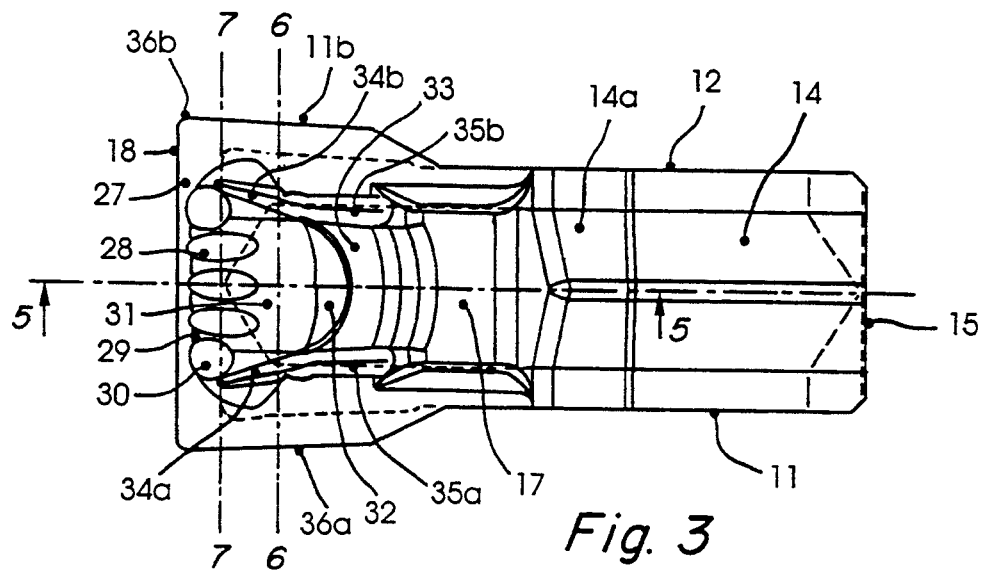
FIG. 3 is a top view of the insert of FIG. 1.
Figure 4:
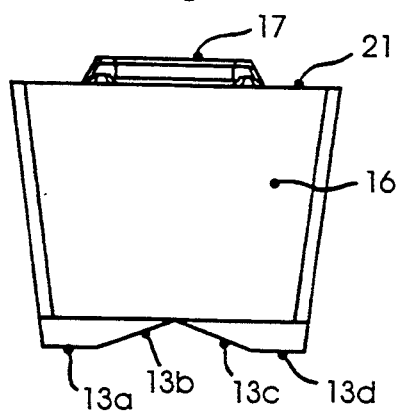
FIG. 4 is a front view of the insert of FIG. 1.
Figure 5:
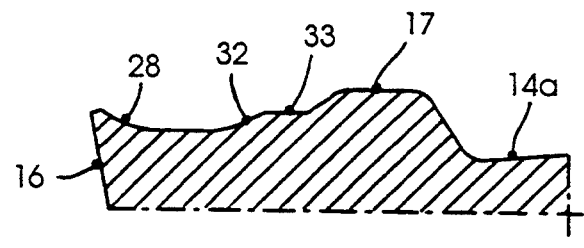
FIG. 5 is a cross-sectional view along the line A—A in FIG. 3.

The primary land 27 is bordered radially inwardly by an array of spaced recesses or grooves 28 extending on the rake face of the insert starting from the primary land 27. The width of the primary land 27 varies along the edge 18 such that the width of the primary land 27 is smaller at those portions located next to the front end portions of each recess 28 whereas the width is larger at inclined rake surface portions 29 located therebetween (FIG. 3). The maximum width of each recess 28 is preferably larger than the distance between the depressions. Each recess 28 has a depth initially increasing in a direction away from said primary land and thereafter decreasing in that direction. There are a number of the centrally provided oval-shaped recesses 28 having a longitudinal extension, extending perpendicularly from the cutting edge 18, that is several times larger than the width of the respective recess 28. Additionally there is, on each side of the central group of oval-shaped recesses 28, a recess 30 having a larger width and shorter length than each of the central recesses 28.

Also formed in the top surface 14 of the insert is a recess 31, which curves inwardly and downwardly from the primary land surface 27 and then curves upwardly to form a rear wall or chip deflector surface 32. The chip deflector surface 32 terminates in a plateau 33 located approximately at the same level as the neutral plane P.

The chipforming area 19 additionally includes a pair of ridges one of which extends from the outer periphery of a respective one of the recesses 30. More specifically, a front ridge portion 34a and 34b are so formed that they converge rearwardly, and they extend rearwardly to the point where they meet with rear ridge portions 35a and 35b which are mutually parallel and extend essentially perpendicularly from the cutting edge 18. Furthermore, the front ridge portions 34a and 34b are formed with a top surface that is raised rearwardly until the location where the front ridge portion 34a, 34b intersects with the rear, straight rear ridge portions 35a, 35b at which intersection the top surface of the rear ridge portion has a level that remains constant further rearwardly. The level of the upper surface of the rear ridge portions 35a, 35b is located somewhat above, and generally parallel to, the plane P.

By arranging the ridges as aforesaid, it is ensured that the chip remains in contact with the forward ridge portions 34a, 34b and that the central portion of the chip is urged deeper into the recess 31. This arrangement further ensures that the total width of the chip is made narrower and becomes more easily manageable so that no harm is made from the chip to the side walls of the groove which is to be formed by the insert during cutting in a metal workpiece.

Figure 6:
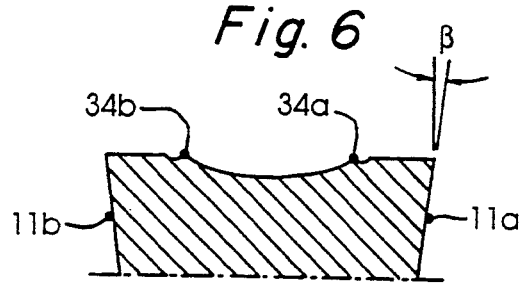
FIG. 6 is a cross-sectional view along the line B—B in FIG. 3.
Figure 7:
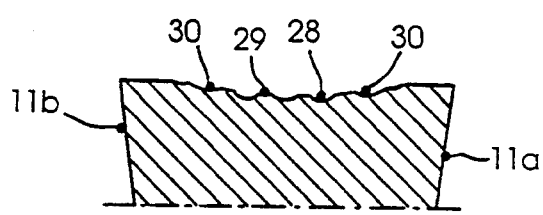
FIG. 7 is a cross-sectional view along the line C—C in FIG. 3.

The forward end of the insert 10 additionally is provided with side cutting edges 36a and 36b, which merge rearwardly to an intermediate position along the insert, while intersecting with the primary land surface 27 which extends along both the main cutting edge 18 and along the side cutting edges 36a, 36b. The clearance faces of the side cutting edges 36a, 36b are designated 11a and 11b. Each clearance face 11a, 11b intersects with the land surface 27 at an acute angle β (FIG. 6).

Figure 10:
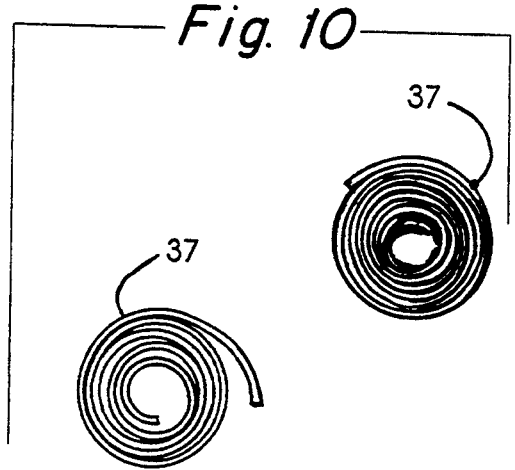
FIG. 10 is a view of a chip obtained from chipforming by the insert of FIGS. 1-7.

By virtue of the particular construction of the chip forming area as aforesaid, it is possible to obtain desirable clock-shaped chips 37 such as shown in FIG. 10. These chips 37 can be obtained at a feed rate of 0.30 mm/revolution. If no proper chip deflection area is provided on the upper rake surface of the insert, chips obtained would otherwise be difficult to manage. Also, at moderate feed rates, the chip forming area of this invention effectively contributes to the control and removal of such chips. When large feeds are used, the chip will be pressed against the rear wall 32 of recess 31 which forces the chip to be bent in a favorable manner.

The embodiment described above also results in a certain reduction of the cutting forces because the grooves or recesses 28, 30 reduce the contact area and increase the positive rake angle. Due to the fact that a reduced contact area is obtained, a relatively low heat generation is obtained.

The principles, preferred embodiments and mode of operation of the present invention have been described. Variations and changes may be made and are contemplated within the invention to the extent such variations and changes fall within the scope of the appended claims.

What is claimed is:

1. A generally rectangularly shaped metal cutting insert for turning and grooving operations, comprising upper and lower front-to-rear extending surfaces, two oppositely disposed side surfaces interconnecting said upper and lower front-to-rear extending surfaces, and front and rear end surfaces each intersecting said upper and lower front-to-rear extending surfaces and said side surfaces, a front portion of said upper surface including a main cutting edge formed by the intersection between said upper surface and said front surface, a chipforming area disposed inside of said main cutting edge and a chip breaking rear wall disposed inside of said chipforming area and extending upwardly therefrom, the chipforming area being formed by a plurality of first recesses centrally located on the upper surface, each of said recesses being located at a predetermined distance inside the cutting edge and having an elongated extension in a direction parallel with a longitudinal extension of the insert, second recesses shorter in length along the longitudinal extension of the insert being arranged on either side of said centrally provided recesses, the chipforming area including a further recess which curves inwardly and downwardly from said flat land area at a smaller depth than the depth of said first and second recesses, said further recess curving upwardly to form said chip breaking rear wall the lateral extension of the further recess being confined by first ridge portions that converge rearwardly and merge at a rearward point with integral second ridge portions, said second ridge portions extending essentially perpendicularly with respect to said main cutting edge.

2. An insert according to claim 1, wherein said first and second recesses are distinctly provided from each other, and a flat land area is provided between the main cutting edge and said first and second recesses.

3. An insert according to claim 2, wherein the rear chip breaking wall terminates rearwardly in a plateau located approximately at the same level as a neutral plane containing said flat land area.

4. An insert according to claim 2, wherein the width of the flat land area varies along the main cutting edge such that said width is smaller at a portion in front of the forward end of each of said first recesses than said width is at portions in front of intermediate rake surfaces located between adjacent ones of said first recesses.

5. An insert according to claim 1, wherein said first ridge portions extend from the outer periphery of said second recesses, and said second ridge portions extending to the forward slope of a shoulder provided rearwardly of said chip breaking rear wall.

6. An insert according to claim 5, wherein said first ridge portions are each formed with a top surface inclined upwards to intersect with a top surface of said rear ridge portions.

7. An insert according to claim 6, wherein the level of the top surface of the rear ridge portions is located at a level above and generally parallel to the level of a neutral plane containing said flat land area.

8. An insert according to claim 1, wherein said first ridge portions are each formed with a top surface inclined upwards to intersect with a top surface of said rear ridge portions.

9. An insert according to claim 8, wherein the level of the top surface of the rear ridge portions is located at a level above and generally parallel to the level of a neutral plane containing said flat land area.

10. An insert according to claim 9, wherein the rear chip breaking wail terminates rearwardly in a plateau located approximately at the same level as a neutral plane containing said flat land area.

11. An insert according to claim 1, wherein the lateral extension of the further recess is confined by first ridge portions that converge rearwardly and merge at a rearward point with integral second ridge portions, said second ridge portions extending essentially perpendicularly with respect to said main cutting edge.

12. An insert according to claim 1, wherein the insert is provided with side cutting edges extending from the forward end, which converge rearwardly to an intermediate position along the insert.

* * * * *